US008584757B2

(12) United States Patent
Reyes

(10) Patent No.: US 8,584,757 B2
(45) Date of Patent: Nov. 19, 2013

(54) METHOD AND COMPOSITION FOR TREATING FLUIDS BEFORE INJECTION INTO SUBTERRANEAN ZONES

(75) Inventor: Enrique Antonio Reyes, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 365 days.

(21) Appl. No.: 13/084,925

(22) Filed: Apr. 12, 2011

(65) Prior Publication Data

US 2011/0259592 A1 Oct. 27, 2011

Related U.S. Application Data

(60) Provisional application No. 61/326,318, filed on Apr. 21, 2010.

(51) Int. Cl.
*E21B 43/22* (2006.01)

(52) U.S. Cl.
USPC ............................ 166/300; 166/279; 166/371

(58) Field of Classification Search
None
See application file for complete search history.

(56) References Cited

U.S. PATENT DOCUMENTS

| | | | |
|---|---|---|---|
| 5,847,120 A | 12/1998 | Collins et al. | |
| 5,853,428 A | 12/1998 | Collins et al. | |
| 5,876,625 A | 3/1999 | Collins et al. | |
| 6,011,152 A | 1/2000 | Gordon-Wylie et al. | |
| 6,054,580 A | 4/2000 | Collins et al. | |
| 6,099,586 A | 8/2000 | Collins et al. | |
| 6,100,394 A | 8/2000 | Collins et al. | |
| 6,136,223 A | 10/2000 | Collins et al. | |
| 6,241,779 B1 | 6/2001 | Collins et al. | |
| 7,060,818 B2 | 6/2006 | Horwitz et al. | |
| 7,159,658 B2 | 1/2007 | Frost et al. | |
| 7,216,704 B2 | 5/2007 | Hanes, Jr. et al. | |
| 7,510,656 B2 | 3/2009 | Shafer et al. | |
| 7,621,330 B1 | 11/2009 | Walters et al. | |
| 2007/0102359 A1 | 5/2007 | Lombardi et al. | |
| 2009/0023613 A1* | 1/2009 | Li et al. | 507/211 |
| 2010/0200501 A1* | 8/2010 | Hoag et al. | 210/620 |

FOREIGN PATENT DOCUMENTS

WO WO 2008/090316 7/2008

OTHER PUBLICATIONS

Ellis, W. Chadwick, Camly T. Tran, Matthew A. Denardo, Andreas Fischer, Alexander D. Ryabov, & Terrence J. Collins, *Design of More Powerful Iron-TAML Peroxidase Enzyme Mimics*, 131 J. Am. Chem. Soc. 18052-18053 (2009).
GreenCAT™ brochure, available at http://www.verutek.com/technologies/wastewater-treatment/greencat/ (Nov. 30, 2011), 3 pages.

Ghosh, Anindya, Douglas A. Mitchell, Arani Chanda, Alexander D. Ryabov, Delia Laura Popescu, Erin C. Upham, Gregory J. Collins, & Terrence J. Collins, *Catalase-Peroxidase Activity of Iron(III)-TAML Activators of Hydrogen Peroxide*, 130 J. Am. Chem. Soc. 15116-15126 (2008).
Evan S. Beach, Jennifer L. Duran, Colin Horwitz, & Terrence J. Collins, *Activation of Hydrogen Peroxide by an Fe-TAML Complex in Strongly Alkaline Aqueous Solution: Homogeneous Oxidation Catalysis with Industrial Significance*, 48 Industrial & Engineering Chemistry Research 7072-7076 3 (2009).
Delia-Laura Popescu, Arani Chanda, Matthew J. Stadler, Sujit Mondal, Jacqui Tehranchi, Alexander D. Ryabov, & Terrence J. Collins, *Mechanistically Inspired Design of FeII-TAML Peroxide-Activating Catalysts*, 130 J. Am. Chem. Soc. 12260-12261 (2008).
Nancy W. Shappell, Melanie A. Vrabel, Peter J. Madsen, Grant Harrington, Lloyd O. Billey, Heldur Hakk, Gerald L. Larsen, Evan S. Beach, Colin P. Horwitz, Kyoung Ro, Patrick G. Hunt, & Terrence J. Collins, *Destruction of Estrogens Using Fe-TAML/Peroxide Catalysis*, 42 Environmental Science & Technology, 1296-1300 (2008).
Victor Polshin, Delia-Laura Popescu, Andreas Fischer, Arani Chanda, David C. Horner, Evan S. Beach, Jennifer Henry, Yong-Li Qian, Colin P. Horwitz, Gabor Lente, Istvan Fabian, Eckard MÄnck, Emile L. Bominaar, Alexander D. Ryabov, & Terrence J. Collins, *Attaining Control by Design over the Hydrolytic Stability of Fe-TAML Oxidation Catalysts*, 130 J. Am. Chem. Soc. 4497-4506 (2008).
Arani Chanda, Sushil K. Khetan, Deboshri Banerjee, Anindya Ghosh, & Terrence J. Collins, *Total Degradation of Fenitrothion and Other Organophosphorus Pesticides by Catalytic Oxidation Employing Fe-TAML Peroxide Activators*, 128 J. Am. Chem. Soc. 12058-12059 (2006).
Terrence J. Collins, *TAML Oxidant Activators: A New Approach to the Activation of Hydrogen Peroxide for Environmentally Significant Problems*, 35 Accounts of Chemical Research 782-790 (2002).
Arani Chanda, Xiaopeng Shan, Mrinmoy Chakrabarti, W. Chadwick Ellis, Delia L. Popescu, Filipe Tiago de Oliveira, Dong Wang, Lawrence Que Jr., Terrence J. Collins, Eckard MÄnck, & Emile L. Bominaar, *(TAML)FeIV-O Complex in Aqueous Solution: Synthesis and Spectroscopic and Computational Characterization*, 47 Inorganic Chemistry 3669-3678 (2008).
Collins, Terrence J.; Horwitz, Colin P.; Ryabov, Alexander D.; Vuocolo, Leonard D.; Gupta, Sayam S.; Ghosh, Anindya; Fattaleh, Nadine L.; Hangun, Yelda; Steinhoff, Bradley; Noser, Christopher A.; Beach, Evan; Prasuhn, Duane; Stuthridge, Trevor; Wingate, Kathryn G.; Hall, Jenny; Wright, L. James; Suckling, Ian; Allison, Robert W., *Tetraamido Macrocyclic Ligand Catalytic Oxidant Activators in the Pulp and Paper Industry*, Advancing Sustainability through Green Chemistry and Engineering, 47-60 (2002).

(Continued)

Primary Examiner — Zakiya W Bates
(74) Attorney, Agent, or Firm — Robert A. Kent; McDermott Will & Emery LLP

(57) ABSTRACT

The invention relates to methods and compositions for producing or recovering an aqueous-based fluid to be utilized or injected in a wellbore or surrounding subterranean formation. The method comprises the step of contacting an aqueous-based fluid with an aqueous-soluble breaker composition comprising an oxidizing agent and a catalyst for a time sufficient to reduce or eliminate one or more deleterious substances in the aqueous-based fluid to produce a treated aqueous-based fluid suitable for use or injection in a wellbore or surrounding subterranean formation.

27 Claims, No Drawings

(56) References Cited

OTHER PUBLICATIONS

Anindya Ghosh, Filipe Tiago de Oliveira, Toshihiro Yano, Takanori Nishioka, Evan S. Beach, Isamu Kinoshita, Eckard MÄnck, Alexander D. Ryabov, Colin P. Horwitz, & Terrence J. Collins, *Catalytically Active Âµ-Oxodiiron(IV) Oxidants from Iron(III) and Dioxygen*, 127 J. Am. Chem. Soc. 2505-2513 (2005).

Mary M. Kirchhoff, *Promoting Green Engineering through Green Chemistry*, 37 Environmental Science & Technology 5349-5353 (2003).

Rebecca L. Lankey, and, Paul T. Anastas, *Life-Cycle Approaches for Assessing Green Chemistry Technologies*, 41 Industrial & Engineering Chemistry Research 4498-4502 (2002).

Christina Noradoun, Mark D. Engelmann, Matthew McLaughlin, Ryan Hutcheson, Kevin Breen, Andrzej Paszczynski, & I. Francis Cheng, *Destruction of Chlorinated Phenols by Dioxygen Activation under Aqueous Room Temperature and Pressure Conditions*, 42 Industrial & Engineering Chemistry Research 5024-5030 (2003).

Wenxing Chen, Wangyang Lu, Yuyuan Yao, & Minhong Xu, *Highly Efficient Decomposition of Organic Dyes by Aqueous-Fiber Phase Transfer and in Situ Catalytic Oxidation Using Fiber-Supported Cobalt Phthalocyanine*, 41 Environmental Science & Technology 6240-6245 (2007).

Naima Chahbane, Delia-Laura Popescu, Douglas A. Mitchell, Arani Chanda, Dieter Lenoir, Alexander D. Ryabov, Karl-Werner Schramm, & Terrence J. Collins, *Fe(III)-TAML-catalyzed green oxidative degradation of the azo dye Orange II by H2O2 and organic peroxides: products, toxicity, kinetics, and mechanisms*, Green Chem. 49-57 (2007).

Lewis Norman, Sanjay Vitthal, & John Terracina, *New Breaker Technology for Fracturing High-Permeability Formations*, SPE, 1-13 (1995).

W. Chadwick Ellis, Camly T. Tran, Riddhi Roy, Marte Rusten, Andreas Fischer, Alexander S. Ryabov, Bruce Blumberg, & Terrence J. Collins, *Designing Green Oxidation Catalysts for Purifying Environmental Waters*, 132 Journal of the American Chemical Society, 9774-9781 (2010).

Yunfu Sun & Joseph J. Pignatello, *Activation of Hydrogen Peroxide by Iron (III) Chelates for Abiotic Degradation of Herbicides and Insecticides in Water*, 41 Journal of Agricultural and Food Chemistry, 308-312 (1993).

\* cited by examiner

METHOD AND COMPOSITION FOR TREATING FLUIDS BEFORE INJECTION INTO SUBTERRANEAN ZONES

CROSS-REFERENCE TO RELATED APPLICATION

This application claims the benefit of U.S. Provisional Patent Application No. 61/326,318 filed Apr. 21, 2010, which is hereby incorporated by reference in its entirety.

FIELD OF THE INVENTION

This invention relates to methods and compositions for producing or recovering an aqueous-based fluid to be utilized in a wellbore or surrounding subterranean formation.

BACKGROUND

In the field of oil or gas operations, various types of treatment fluids are often used to treat a wellbore or a portion of a subterranean formation with the aim to produce oil or gas from a reservoir. Resource recovery also spans the field of geothermal operations, including enhanced geothermal systems where rock fracturing and water injection treatments are carried out. In these operations, treatment fluids are often introduced into a wellbore, during drilling, stimulation, completion, servicing, workover, or any other stages. The treatment fluids are typically, but not necessarily, aqueous-based. An example of an aqueous-based treatment fluid is a fracturing fluid, for instance, a fracturing fluid that may be used in a fracture treatment performed on a wellbore or surrounding subterranean formation to enhance or restore the productivity of the wellbore.

There is a great demand of aqueous-based fluids in variety of wellbore or subterranean formation treatments. For example, fracturing a subterranean formation typically requires hundreds of thousands of gallons of fracturing fluids. Moreover, multiple fracturing treatments are often desirable to treat more than one zone in the subterranean formation. Thus, maximizing hydraulic conductivity through fracturing a subterranean formation may require thousands to even millions of gallons of aqueous-based fluids.

With the rising demand for potable water (e.g., drinking water) and freshwater, and with the rising costs of obtaining potable water and freshwater, it would be desirable to use any water source, sometimes lower quality water, in wellbore and subterranean formation. However, for such water to be suitable for use in a typical wellbore treatment, materials that would be detrimental to the chemistry involved in the wellbore treatments need to be reduced or eliminated.

There is also increasing public concern for the environment due to large quantities of lower-quality water produced from wellbore and subterranean formation. Handling and disposal of such water is an issue, as these water sources may contain many deleterious materials (sometimes referred to as water contaminants in waste water treatment) and hence are not typically surface dischargeable. Therefore, it would also be desirable to recover or reclaim the lower-quality water for further usage, such as in a wellbore or subterranean formation treatment, or at the minimum, recover the lower quality water before it is re-injected back into the subterranean formation.

Therefore, there is a continuing need in the art for methods to reduce or eliminate the deleterious substances that can be found in a recovered or flow-back aqueous-based fluid so it can be used or injected into a wellbore or subterranean formation. This invention answers that need.

SUMMARY OF THE INVENTION

One aspect of the invention relates to a method of producing a treated aqueous-based fluid to be utilized in a wellbore or surrounding subterranean formation. The method comprises the step of contacting an aqueous-based fluid with an aqueous-soluble breaker composition comprising an oxidizing agent and a catalyst for a time sufficient to reduce or eliminate one or more deleterious substances in the aqueous-based fluid to produce a treated aqueous-based fluid suitable for use in a wellbore or surrounding subterranean formation. The catalyst in the breaker composition has the structure of formula (I) or formula (II):

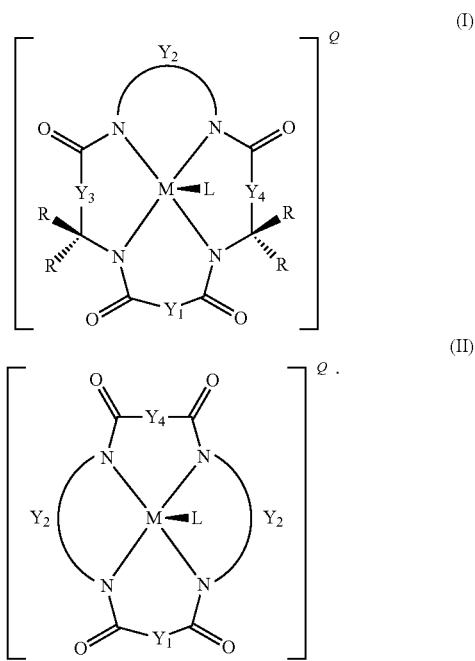

In each formulas I and II, $Y_1$, $Y_3$ and $Y_4$ each independently represent a bridging group having zero, one, two or three carbon containing nodes for substitution, and each $Y_2$ independently represents a bridging group having at least one carbon containing node for substitution, each said node containing a C(R), or a C(R)$_2$ unit and each R substituent may be the same or different from the remaining R substituents and (i) is selected from the group consisting of alkyl, alkenyl, cycloalkyl, cycloalkenyl, aryl, alkynyl, alkylaryl, halogen, alkoxy, phenoxy, CH$_2$CF$_3$, CF$_3$ and combinations thereof, (ii) form a substituted or unsubstituted benzene ring of which two carbon atoms in the ring form nodes in the Y unit, or (iii) together with a paired R substituent bound to the same carbon atom form a cycloalkyl or cycloalkenyl ring, which optionally include an atom other than carbon; M is a transition metal with oxidation states of I, II, III, IV, V, VI, VII or VIII or selected from Groups 3, 4, 5, 6, 7, 8, 9, 10, 11 and 12 of the Periodic Table of the Elements; Q is any counterion which would balance the charge of the compound on a stoichiometric basis; and L is any labile ligand.

Another aspect of the invention relates to a method of recovering an aqueous-based fluid, which can then be utilized, for instance, in a wellbore or surrounding subterranean formation. The method comprises the steps of providing an aqueous-based fluid that has been extracted from a wellbore or surrounding subterranean formation; and contacting the aqueous-based fluid with an aqueous-soluble breaker composition comprising an oxidizing agent and a catalyst for a time sufficient to reduce or eliminate one or more deleterious substances in the aqueous-based fluid, thereby allowing the aqueous-based fluid to be reused. The recovered fluid has various uses, such as in a wellbore or subterranean formation treatment. The catalyst in the breaker composition has the structure of formula (I) or formula (II), described above.

Yet another aspect of the invention relates to a method of treating an aqueous-based fluid in the wellbore and/or treating at least a portion of a wellbore or surrounding subterranean formation. The method comprises the step of introducing into a wellbore or surrounding subterranean formation an aqueous-soluble breaker composition comprising an oxidizing agent and a catalyst for a time sufficient to allow the breaker composition to contact an aqueous-based fluid and/or at least a portion of the wellbore or surrounding subterranean formation and reduce or eliminate one or more deleterious substances in the aqueous fluid and/or in the wellbore or surrounding subterranean formation. The catalyst in the breaker composition has the structure of formula (I) or formula (II), described above.

DETAILED DESCRIPTION OF THE INVENTION

One aspect of the invention relates to a method of producing a treated aqueous-based fluid to be utilized in a wellbore or surrounding subterranean formation. The method comprises the step of contacting an aqueous-based fluid with an aqueous-soluble breaker composition for a time sufficient to reduce or eliminate one or more deleterious substances in the aqueous-based fluid to produce a treated aqueous-based fluid suitable for use in a wellbore or surrounding subterranean formation.

In the context of certain oilfield operations, the term "breaker" includes oxidizers, such as peroxides. Many oilfield applications rely on the use of a breaker composition that includes a powerful oxidant such as a source of hypochlorite, persulfate, perborate, or even enzymes. However, when operating at low temperatures (e.g., below 100° F.) or when a highly stable polymeric substance needs to be broken down, such as a highly cross-linked or stable polysaccharide, a catalyst may be required to activate the oxidant. Moreover, some oxidants, such as hydrogen peroxide, are not reactive enough under most conditions without a catalyst or other activator.

In some occasions, the use of the oxidant/activator combination may be subject to inefficiencies due to the large concentration of highly persistent or degradation-resistant substances, such as organic materials found in viscosified fluids. The compositions of fluids to be treated and the treatment conditions are also highly variable, further complicating the application of the specific oxidant/activator combination. Obtaining the appropriate combination of the oxidant and activator as well as the high efficiency of the oxidant/activator at various conditions is often cumbersome.

The breaker composition of the invention comprises an oxidizing agent and a catalyst. The breaker composition is generally fully aqueous-soluble, easy to handle, stable and suitable to degrade variety of substances over a broad range of conditions (such as temperature, pH, salinity). The use of certain catalysts, for instance, TAML® ligands, provides a solution to limitations that hydroperoxides and other powerful oxidants may encounter in the field of organic substrate mineralization or degradation. For instance, the catalyst possesses stability over a broad pH range (3-14) against hydrolysis and auto-oxidation (self-degradation). The catalyst possesses peroxidase-like and even catalase-like activity, shows prolonged lifetimes and can sustain catalytic cycles at very low concentration (µM with respect to catalyst). For example, the catalyst may achieve greater than 10,000 turnovers per hour at micromolar or lower concentrations increasing the efficiency of the oxidative process. The loading amount and ratio of catalyst/oxidant are relatively small when compared to other conventional activators, such as $Fe^{2+}$-citric acid activator. The catalyst also has minimal toxicity compared to other conventional activators that contain transition metals, such as Co- or Cu-based activators. All the above advantages are offered in a single system in the breaker composition of this invention.

The term "catalyst," as referred herein, includes precatalysts and actual catalyst complexes, where the latter is the species that carries out the oxidation reaction and acts as the activator of the oxidizing agent.

The catalyst in the breaker composition has the structure of formula (I) or formula (II):

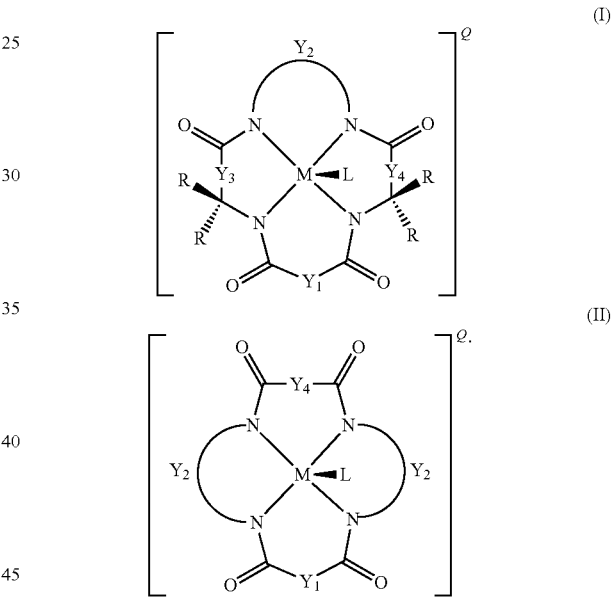

In each of formulas (I) and (II), $Y_1$, $Y_3$ and $Y_4$ each independently represent a bridging group having zero, one, two or three carbon containing nodes for substitution, and each $Y_2$ independently represents a bridging group having at least one carbon containing node for substitution, each said node containing a C(R), or a C(R)$_2$ unit and each R substituent may be the same or different from the remaining R substituents and (i) is selected from the group consisting of alkyl, alkenyl, cycloalkyl, cycloalkenyl, aryl, alkynyl, alkylaryl, halogen, alkoxy, phenoxy, $CH_2CF_3$, $CF_3$ and combinations thereof, (ii) form a substituted or unsubstituted benzene ring of which two carbon atoms in the ring form nodes in the Y unit, or (iii) together with a paired R substituent bound to the same carbon atom form a cycloalkyl or cycloalkenyl ring, which optionally include an atom other than carbon; M is a transition metal with oxidation states of I, II, III, IV, V, VI, VII or VIII or selected from Groups 3, 4, 5, 6, 7, 8, 9, 10, 11 and 12 of the Periodic Table of the Elements; Q is any counterion which would balance the charge of the compound on a stoichiometric basis; and L is any labile ligand.

A particular embodiment of the catalyst for the breaker composition is a macrocyclic tetraamido ligand, represented by the structure of formula (III):

An exemplary structure of the catalyst is represented by the structure of formula (IV):

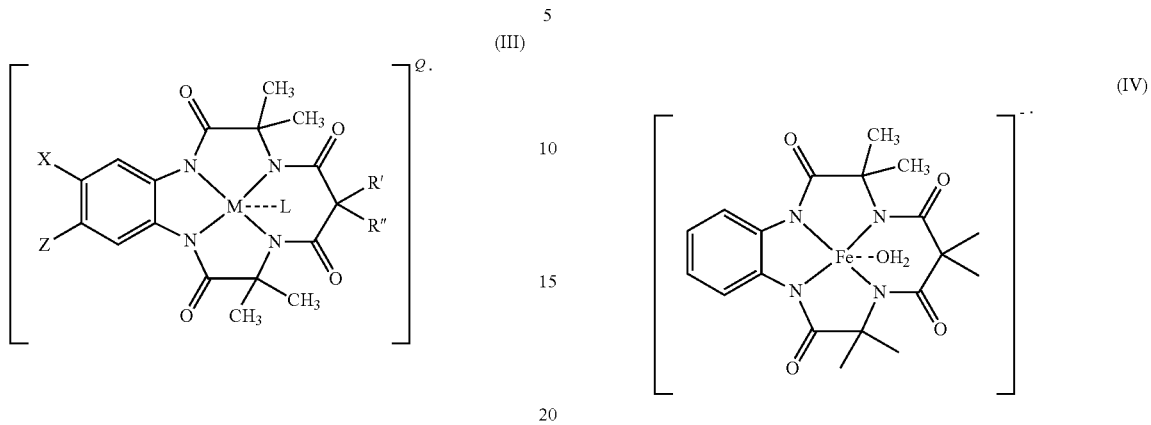

In formula (III), each of X and Z is independently H, an electron-donating group or electron-withdrawing group. Electron-withdrawing groups include, but are not limited to, halogens, such as Br, I and Cl; $SO_3^-$; $OSO_3^-$; $OSO_3-R_1$, where $R_1$ may be H, alkyl, aryl, or alkylaryl; and $NO_2^-$. Electron-donor groups include, but are not limited to, alkoxy, such as methoxy, ethoxy, propoxy or butoxy; alkyl, such as methyl, ethyl, propyl, n-butyl or t-butyl; and hydrogen. Both the electron-donating groups and electron-withdrawing groups change the electron density of the metal ligand complex and impact its reactivity. In one embodiment, each of X and Z is independently H, Cl, or $NO_2^-$.

R' and R" can impact the sustained catalytic stability of the macrocyclic tetraamido ligands. Each of R' and R" is the same or different and is selected from the group consisting of H, alkyl, alkenyl, cycloalkyl, cycloalkenyl, aryl, alkynyl, alkylaryl, halogen, alkoxy, phenoxy and combinations thereof. Alternatively, R' and R" combine to form a cycloalkyl or cycloalkenyl ring, which optionally contains at least one atom other than carbon. In one embodiment, each of R' and R" is independently a short chain alkyl or halogen. For instance, R' and R" may be the same and may be ethyl, methyl or fluorine. In one embodiment, R' and R" combine to form a cycloalkyl or cycloalkenyl ring, for instance, a cyclopentyl or cyclohexyl ring. The cycloalkyl ring may include at least one other atom other than carbon, such as N, O, or S.

M is a transition metal with oxidation states of I, II, III, IV, V, VI, VII or VIII. M may be selected from Groups 3, 4, 5, 6, 7, 8, 9, 10, 11 or 12 of the Periodic Table of the Elements. In one embodiment, M is Fe, Mn, Cr, Cu, Co, Ni, Mo, Zn, or W. Mixtures of catalysts, each with different transition metal M, may also be possible.

Q is any counterion which would balance the charge of the compound on a stoichiometric basis. Typically, the charge of the compound is negative, for instance, −1. Exemplary counterions for Q are positively charged counterions including, but not limited to, alkali metal counterions (e.g., K, Li, Na), $NR^*_4$ and $PR^*_4$, where each $R^*$ is independently H, alkyl, aryl, alkylaryl, or alkenyl; or $R^*$ can fuse together to form a cycloalkyl or cycloalkenyl or aryl ring which may contain at least one atom other than carbon.

L may be absent or may be any labile ligand which can attach to M. Suitable labile ligands include, without limitation, $H_2O$, $Cl^-$, and $C\equiv N^-$.

Another particular embodiment of the catalyst for the breaker composition is represented by the structure of formula (V):

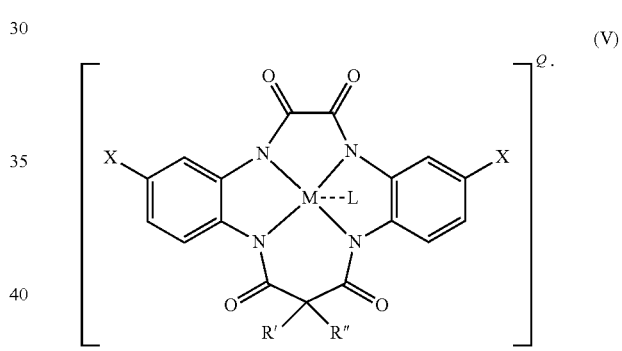

X, R', R", M, Q, and L in formula (V) are the same as described in the embodiments of the structure of formula (III).

Exemplary structures of the are is represented by the structure of formula (VI) and formula (VII):

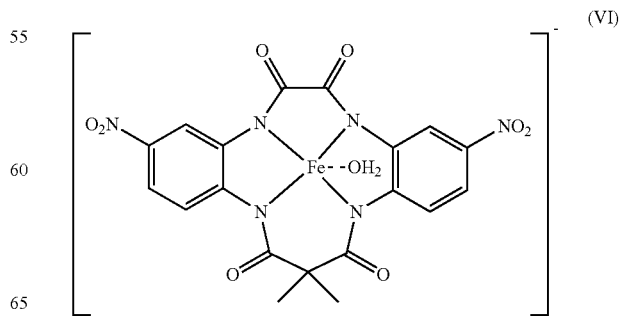

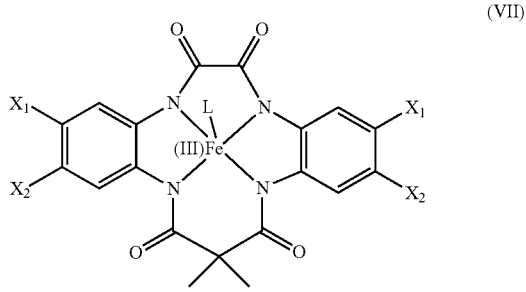

(VII)

where X1=H and X2=H, X1=NO2 and X2=H, or X1=X2=Cl.

Carefully designed tetra-amido macrocyclic ligands, such as those referred to as TAML®, have been used as green oxidation catalysts. See, e.g., Collins, "TAML Oxidant Activators: A New Approach to the Activation of Hydrogen Peroxide for Environmentally Significant Problems," Acc. Chem. Res. 35 (9): 782-790 (2002), herein incorporated by reference in its entirety. The synthetic strategies and the use of the $Fe^{III}$-TAML® catalyst in the bleaching and oxidizing operations in the pulp and paper industry have been described in, for example, U.S. Pat. Nos. 7,060,818; 6,099,586; 6,051,704; and 6,241,779.

The $Fe^{III}$-TAML® catalyst is robust, stable, and does not induce oxidative self-degradation of its stabilizing ligands, as is the case with $Fe^{II}$-EDTA or $Fe^{II}$-citrate, usually employed in advanced oxidation systems such as Fenton-type systems, or with other $Fe^{III}$ complexes. See, e.g., Sun et al., "Activation of Hydrogen Peroxide by Iron(III) Chelates for Abiotic Degradation of Herbicides and Insecticides in Water," J. Agric. Food Chem. 41: 300-312 (1993). The Fenton reagent is a highly active yet unselective oxidative system that consists of $Fe^{II}L_6$ (L is a water ligand) and $H_2O_2$ at varying ratios of $Fe^{II}/H_2O_2$, and produces free hydroxyl radicals (HO.) at pH<3, typically pH at 2, in water. Fenton-type or Fenton-like system also includes modification of Fenton reagent such as substitution of $Fe^{II}$ for $Mn^{III}$, $Co^{II}$ or $Cu^{I}$, the use of iron oxides instead of $Fe^{II}$(aq), ion stabilization via chelation by using chelating agents such as EDTA, and a few other variants. See, e.g., Holgne et al., "Hydroxyl Radical Formation in Aqueous Reactions (pH 3-7) of Iron (II) with Hydrogen Peroxide: the Photo-Fenton Reaction," Environ. Sci. Technol. 26(2): 313-319 (1992); Watts et al., "Role of Reductants in the Enhanced Desorption and Transformation of Chloroaliphatic Compounds by Modified Fenton's Reactions," Environ. Sci. Technol. 33(19): 3432-3437 (1999). However, using Fenton-type or Fenton-like system may not be practical in the degradation or mineralization of organic matter at any given pH, such as from 3 to 14, and particularly, under more environmentally benign conditions such as near neutral pH.

It is believed that the $Fe^{III}$-TAML® catalyst produces a hydroxyl radical in conjunction with at least other oxidative reactive intermediate, the latter still possessing selectivity, hydrolytic and oxidative stability, and much higher reactivity than the reactive intermediates found in Fenton systems. See, e.g., Collins, Acc. Chem. Res. 35 (9): 782-790 2002; Popescu et al., "Mechanistically Inspired Design of FeIII-TAML Peroxide-Activating Catalysts," J. Am. Chem. Soc. 130 (37): 12260-12261 (2008). The catalysts used in the invention exhibit similar reactivity and specificity in oxidation reactions as the $Fe^{III}$-TAML® catalysts. Therefore, upon utilizing the catalysts described herein, oxidation reactions can be achieved employing small amounts of oxidant and catalyst under a broad range of conditions.

Conventional activators, such as compounds containing ferrous ions, can also be added in the breaker composition. Exemplary ferrous compounds include iron (II) sulfate heptahydrate ($FeSO_4.7H_2O$), iron (II) chloride ($FeCl_2$), iron (II) gluconate, and combinations thereof.

The oxidizing agent in the breaker composition may be any oxidant that can be activated by the catalyst, such as those oxidizing compounds having oxygen-transfer atoms. Suitable oxidizing agents include, but are not limited to, peroxides, persulfates, perphosphates, perborates, percarbonates, persilicates, oxyacids and oxyanions of halogens, and derivatives thereof and combinations thereof. In one embodiment, the oxidizing agent is persulfate, such as sodium persulfate, ammonium persulfate, potassium persulfate, potassium peroxymonosulfate or Caro's acid. The oxidizing agent may be an oxyacid or oxyanion of halogen, for instance, hypochlorous acid, hypochlorites, chlorous acid and chlorites, chloric acid and chlorates, perchloric acid and perchlorate, or derivatives thereof and combinations thereof.

In one embodiment, the oxidizing agent is an inorganic or organic compound containing the —O—O— peroxide linkage. Exemplary compounds include hydrogen peroxide, hydrogen peroxide adducts, compounds capable of producing hydrogen peroxide in aqueous solution, and organic peroxides. Hydrogen peroxide adducts include, but are not limited to, alkali metal (e.g., sodium, lithium, potassium) carbonate peroxyhydrate, urea peroxide and other adducts that may liberate hydrogen peroxide in solution. Compounds capable of producing hydrogen peroxide in aqueous solution also include alkali metal perborates (mono- and tetrahydrate). Alternatively, an alcohol oxidase enzyme and its appropriate alcohol substrate can be used as a hydrogen peroxide source. Exemplary organic peroxides include those represented by the formula $R_1$—O—O—$R_2$, wherein each of $R_1$ and $R_2$ is independently H, substituted or unsubstituted alkyl, substituted or unsubstituted aryl, alkyl or aryl substituted carbonyl. For instance, the organic peroxide may be t-butyl, benzoyl and cumene hydroperoxides, t-butyl, benzoyl and cumene peroxide, peroxy acids such as meta-chloroperoxybenzoic acid (mCPBA), and the like.

The amount of the breaker composition necessary to use may depend on several factors including, but not limited to, the specific breaker composition, the amount and ratio of the oxidizing agents and the specific catalyst in the breaker composition, the contacting time desired, the temperature, pH, and ionic strength of the aqueous-based fluid. For instance, the actual amount of oxidizing agent and catalyst used in the aqueous-based fluid may be highly dependent on reacting conditions, such as pH, temperature, ionic strength. Furthermore, the precise concentration ranges of oxidizing agents and the specific catalyst may also be determined by the content and characteristics of the deleterious substances in the aqueous-based fluid that are sought to be reduced or eliminated. The deleterious substance may be an organic substance or organometallic substance. In one embodiment, the oxidizing agent may range from about 0.001 wt % to about 25 wt % based on the total weight of the aqueous-based fluid, for instance, from about 0.02 wt % to about 0.25 wt %, or from about 0.001 wt % to about 2 wt %. Accordingly, the catalyst may be present in the aqueous-based fluid from about 0.001 wt % to about 10 wt %, for instance, from about 0.1 wt % to about 1 wt %. For example, at 25° C. and pH 9, a ratio of about $2\times10^{-4}$:1 (catalyst:oxidant) may be used to reduce or eliminate a specific substance in the fluid; a ratio of about $1\times10^{-4}$:1 may be used to reduce or eliminate a different type of substance in the fluid. The loading molar ratio of the catalyst to the oxidizing agent may be as small as about $1\times10^{-6}$:1. Thus, and depending on pH, the loading molar ratio of the catalyst to the oxidizing agent may range from about $1\times10^{-6}:1$ to $1\times10^{-4}:1$, or from about $1\times10^{-3}:1$ to about $1\times10^{-2}:1$. These ratios, however, may vary depending on temperature, organic substrate, pH and ionic strength.

Additionally, it may be beneficial to further include a mutual solvent or cosolvent in a breaker composition. A "mutual solvent" may refer to a chemical additive that is soluble in oil and aqueous fluid, such as water or brine-based fluids. Exemplary mutual solvent or cosolvent includes, but are not limited to, alcohols such as t-butanol, methanol, ethanol, isopropanol, and ethers such as ethyleneglycolmonobutyl ether.

The breaker composition may be used at a wide range of temperatures. Use of the catalyst described herein in the breaker composition enhances the reaction kinetics and allows the working temperature of reactions to be reduced to room temperature. For example, the working temperature may range from room temperature to about 130° C., from room temperature to about 90° C., from room temperature to about 70° C., or from about 25° C. to about 50° C.

The breaker composition may also be used at a wide pH range, such as from about 3 to about 14. The pH range for the breaker composition can be adjusted to tune the activity of the catalyst. In one embodiment, the working pH may be from about 7 to about 11. This broad range of working pH is an improved feature of using the catalyst of the invention, compared to the conventional Fe-chelated catalyst, i.e. $Fe^{2+}$ and citric acid, where the working pH range is 3-7. See, for example, U.S. Pat. No. 7,159,658.

While not necessary, pH-adjusting agents may be used in the invention. Suitable pH-adjusting agents include, without limitation, organic or inorganic bases, organic or inorganic acids, and buffer agents, which can be any appropriate combination of acid and base conjugate. Exemplary inorganic bases include those represented by MOH, where M is a metal from group 1 or group 2, a transition metal, or a metal or metalloid from group 13, 14, or 15; carbonate salt; bicarbonate salt; and combinations thereof. Exemplary inorganic acids include HCl, HBr, fluoroboric acid, sulfuric acid, nitric acid, acetic acid, formic acid, methanesulfonic acid, propionic acid, chloroacetic or dichloroacetic acid, citric acid, glycolic acid, lactic acid and combinations thereof. The pH-adjusting agents should be chosen appropriately to avoid imparting deleterious characteristics to the aqueous fluid being treated. For instance, they should be chosen to avoid causing damage to the surface equipment containing the aqueous fluid being treated, or to avoid causing damage to the wellbore or subterranean formation (e.g., perturbing the wellbore's productivity potential) where the treated aqueous fluids are subsequently used for desired operations. The pH-adjusting agents used herein should not lead to the deactivation of the activator or catalyst in the breaker composition, for example, as those explained in Ryabov & Collins, Adv. Inorg. Chem., 61: 471-521 (2009).

The breaker composition may include sequestering agents or chelating agents. These sequestering/chelating agents may be used to complex with the cations present in the aqueous fluid to minimize undesirable reactions involving in the aqueous-based fluid. For example, undesirable precipitation of ferric hydroxide from the breaker composition may be possible when the breaker composition includes a source of ferrous ions and a source of hydrogen peroxide, reaching a pH of greater than 3.0 to 4.0; and adding a chelating agent prevents or retards such precipitation. As another example, presence of certain trace metal ions in the aqueous fluid from the catalyst/activator can break down available oxygen and result in undesirable pre-loss of oxygen from the oxidizing agent; and adding a chelating agent can slow down such loss.

Exemplary chelating agents include, but are not limited to, ammonium, hydroxyethylenediaminetetraacetic acid (EDTA), N-(2-hydroxethyl)ethylenediaminetriacetic acid (HEDTA), hydroxyethyliminodiacetic acid (HEIDA), methylglycine diacetic acid (MGDA), L glutamic acid, N,N-diacetic acid (GLDA), ethylenediaminedisuccinic acid (EDDS), beta-alaninediacetic acid (beta-ADA), diethylenetriaminepentaacetic acid (DTPA), cyclohexylenediaminetetraacetic acid (CDTA), nitrilotriacetic acid (NTA), diphenylaminesulfonic acid (DPAS), phosphonic acid, alkylphosphonic acids or phosphonate salts where the alkyl group is any that provides sufficient aqueous solubility in the pH range of interest, citric acid, iminodiacetic acid, gluconic acid, and ammonium, alkali (Group I metal) or alkaline-earth (Group 2 metal) salts thereof, and combinations thereof. In choosing the appropriate chelating agents, one should consider whether the physical and chemical properties of chelating agent are suitable for use in the breaker composition to treat the aqueous fluid. For example, one factor to consider is the solubility of the chelating agent, which is dependent on various parameters, such as pH, temperature, ionic strength, and organic substance in the aqueous fluid. It may be desirable to avoid precipitation of the chelating agent or the salt of the chelating agent.

The breaker composition may also include an anion source. The presence of anions, such as chloride ($Cl^-$), bromide ($Br^-$), phosphate ($PO_4^{3-}$), perchlorate ($ClO_4^-$), sulfate ($SO_4^{2-}$) and nitrate ($NO_3^-$) ions, can increase the rate of oxidation by decomposing hydrogen peroxide into hydroxyl radicals. Suitable anion sources may be any salt that is capable of dissociating into these anions. In one embodiment, the salt may be those represented by $MX_n$, where X is the anion such as chloride, bromide, phosphate, perchlorate, sulfate or nitrate; M is a metal from Group 1 or 2, or a transition metal salt; and n is the corresponding stoichiometric coefficient that balances the charge of M. Typically, M is Na, K, Cs, Li, Mg, Ca, Ba, Sr, Fe, Co, Cu, Al, Zr, or Ti.

In choosing the appropriate anion source, one should be cautious that some anions may be involved in competing and complicating interactions. For instance, certain anions may also participate in competing reactions through complexation or scavenging reactions which can decrease the oxidation rate by forming less reactive inorganic radicals, such as sulfate radicals, $(SO_4.)^-$ or chlorine radicals, $(Cl.)^-$. The metal ions of the anion source should also be appropriately chosen to avoid a negative impact on the oxidation reaction in treating the aqueous fluids and to avoid a negative impact on the treated fluids and their use in any subsequent operations. For instance, although sulfate ion typically increases the reaction rate of the oxidant, the salt of divalent metal ions and sulfate may not be desirable, as this salt can lead to precipitation, which can negatively impact certain oilfield applications. When an anion source is desirable in the breaker composition, one skilled in the art will be able to determine a suitable anion source to be used, in view of the breaker composition, the deleterious substances in the aqueous fluids and the subsequent operations that the treated aqueous fluids will be used in.

The aqueous-based fluids to be treated include any fluid source that may be used or injected in a wellbore or surrounding subterranean formation. The fluid source to be treated is not necessarily high-quality aqueous fluids (e.g., potable water and freshwater). Often, lower quality aqueous fluid, such as returned fluid (sometimes referred to as "flow-back" fluid) from the delivery of a treatment fluid, "produced" fluid, or other type of aqueous fluids such as an "end of pipe (EOP)" stream may also be used. Therefore, the aqueous-based fluids may contain many substances deleterious to the performances of the aqueous fluids for the anticipated use. A "flow-back" fluid may refer to any fluid flowing into a wellbore following a treatment, either in preparation for a subsequent phase of treatment or in preparation for cleanup, and subsequently returning back from the wellbore. For example, any type of treatment fluids can be a flow-back fluid. A "produced" fluid can be used to describe any fluid produced from a wellbore that is not a treatment fluid. For instance, produced fluid may contain a large quantity of waste water as a by-product in generating desired hydrocarbon products from oil/gas production operations. In oil/gas field operation, a fluid extracted from a wellbore or subterranean formation may be a mixture of flow-back fluid, produced fluid and other fluids. Fluids from an EOP stream may not originate from a subterranean formation penetrated by a wellbore; instead, it may originate from a primary operation that has a different point source or point of origin. For example, a discharge stream from wastewater treatment plant that has undergone primary, secondary, and/or tertiary treatment; a stream from a manufacturing operation that has been designated suitable for disposal, hence meets applicable regulatory criteria; or a stream that emanates from a pulp and paper mill or from a municipal wastewater treatment plant. A person skilled in the art will recognize the various parameters and characteristics that comprise end-of-pipe effluents and how these effluents would be of potential value to oilfield operations requiring copious amounts of water. The aqueous-fluid to be treated is not limited to fluids produced from and oil/gas field operation, but can be from any other operations or sources that may be recognized by one skilled in the art.

Aqueous-based fluids may contain different types of substances deleterious to the performances of the aqueous fluids for the anticipated use. For example, aqueous fluid extracted from wellbore or subterranean formation may contain highly dissolved hydrocarbon content and mineral content, or remnant well drilling and/or well stimulation chemicals, including biocides, lubricants, drilling mud and mud system polymer additives. In addition, aqueous fluid extracted from deep down in a wellbore has an increased solvation power relative to surface ambient pressure-temperature water, and may further absorb atmospheric gases and create new organic and inorganic chemical species, solid compound precipitations.

The deleterious substances to be removed from aqueous-based fluid may include, but are not limited to, insoluble crude oil residuals (e.g., dispersed oil droplets), grease, soluble hydrocarbons (such as benzene, toluene, and other dissolved aryl and alkyl groups and organic acids), miscible organic compounds other than hydrocarbons (e.g., polymeric and non-polymeric gelling agents, well stimulants such as guar and polyacrylamides, surfactants, and polymeric lubricants), microbes (such as viruses and bacteria), emulsions, colloids (e.g., colloids of immiscible organic acids, such as humic acid), and dissolved gases, such as hydrogen sulfide. These substances are often undesirable and need to be removed for subsequent usage or prior to disposal.

Often, the aqueous-based fluid contains variable concentrations of highly persistent or degradation-resistant substances, such as polymethacrylamides or other organic materials, which are particularly undesirable in fluids for use in injection in wellbore and subterranean formation. The breaker composition of this invention is designed to reduce or remove these undesirable substances in the aqueous-based fluid.

In one embodiment, the aqueous-based fluid to be treated may be a flow-back fluid containing deleterious substances from previous treatments. For example, the aqueous-based fluid to be treated may contain deleterious substances from previous high-viscosity fracturing operations, for instance, gellants in the form of polymers with hydroxyl groups, such as guar gum or modified guar-based polymers; cross-linking agents including borate-based cross-linkers; non-emulsifiers.

The aqueous-based fluid to be treated may also contain deleterious substances from previous drilling treatments, for instance, bactericides; anti-foam agents and defoamers; emulsifiers; friction reducers; viscosity stabilizers; demulsifiers; corrosion inhibitors; clay stabilizers; scale inhibitors; shale control inhibitors; alcohols; deicers including methanol and thinners and dispersants; and acids and caustics such as soda ash, calcium carbonate, sodium hydroxide and magnesium hydroxide; and the like.

The aqueous-based fluid to be treated may contain deleterious substances from previous slickwater fracturing operations. The term "slickwater" refers to low viscosity fluid (i.e., a viscosity less than that used for fracturing gels) containing friction reducing agents to modify the flow characteristics of the fluid. Exemplary friction reduction agents include polyethylene oxide and polyvinyl polymers, polymethacrylamides, cellulose ethers, polysaccharides, and lignosulfonates.

When the aqueous-based fluid is being treated for wellbore or subterranean formation use, the undesirable substances sought to be reduced or eliminated may depend on the type of treatments anticipated. For example, a typical wellbore treatment that needs large volumes of water is a fracturing treatment. Typically, producing a useful fluid for fracturing treatment involves adding one or more viscosity-increasing substances in the fluid. For instance, fracturing treatment operations that require the placement of particulates, including proppant materials or siliceous materials such as sand, employ viscosity-increasing substances. Hence, a suitable fluid for use as a fracturing fluid typically needs to be mixed with an economical amount of viscosity-increasing substances, such as those gellants in the form of polymers with hydroxyl groups (e.g., guar gum, guar gum derivatives, or other commonly applied gelling agent in the oilfield industry that will create a fracturing fluid gel). In this scenario, an aqueous fluid may not be suitable for use as a fracturing fluid if there is a substance, particularly of an organic character, in the aqueous fluid that interferes with the target properties of the fracturing fluid. Additionally, reusing slickwater is becoming a feasible option; but if the aqueous-based fluid contains a substance that prevents its reuse, i.e., a scale inhibitor or a surfactant, the fluid may not be suitable for use as a fracturing fluid. The breaker composition, in this case, will be used to reduce or remove such deleterious substances from the aqueous-based fluid to produce a suitable fracturing fluid.

The aqueous-based fluid being treated may be used in many other oilfield or subterranean formation operations, for instance, matrix acidizing, fracture acidizing, water management or conformance, fluid diversion, sand and scale control, and the like. The deleterious substances in these operations is known in the art, as described in, e.g., Kalfayan, "Production Enhancement with Acid Stimulation," PennWell Corporation, Tulsa, Okla., 2000; Gdanski et al., "Advanced Sandstone Acidizing Designs Using Improved Radial Models," SPE Annual Technical Conference and Exhibition, 38597-MS (1997); Tuedor et al., "A Breakthrough Fluid Technology in Stimulation of Sandstone Reservoirs," SPE International Symposium and Exhibition on Formation Damage Control, 98314-MS (2006); Zhu et al., "Using Integrated Information to Optimizing Matrix Acidizing," SPE European Formation Damage Conference 68930-MS (2001), which are incorporated herein as reference in their entirety. The breaker composition may be then used to reduce or remove deleterious substances from the aqueous-based fluid to produce a suitable fluid for these operations.

A wide variety of parameters known to one skilled in the art may be used to monitor the treatment of aqueous-based fluids by the breaker composition. For example, the concentration or amount of the undesirable components in the aqueous-based fluid may be monitored before, during, and after the treatment. Physical parameters of the aqueous fluid, such as viscosity, total organic carbon (TOC), turbidity, may also be used to monitor the treatment of the aqueous-based fluid. The parameters may be used separately or combined to monitor the treatment. One skilled in the art will be able to determine suitable parameters for monitoring the reduction and elimination of the deleterious substances in the aqueous-based fluids being treated, in view of the deleterious substances in the aqueous fluids and the subsequent operations that the treated aqueous fluids will be used in.

The aqueous-based fluid to be treated could potentially be a mixture of water-miscible and immiscible fluids. Hence, additional separation steps may be used prior to or after the step of contacting the fluid with the breaker composition. For instance, oil, and grease and suspended solids can be separated from the aqueous-based fluid by oil separator and filtering devices, such as oil separation by air flotation, by coalescence, by nut-shell filtration, by carbon filtration, by bedded-stacked media filtration; and suspended solids can be removed by deep-bed filtration, pressure filtration and/or bag, cartridge and bedded-stacked media bed filtration. One skilled in the art will recognize the appropriate techniques to separate aqueous-immiscible components in the aqueous-based fluid from the other components in the aqueous-based fluid.

The catalyst's activity may be modified by the presence of a surfactant. The activity of Fe-TAML catalyst increases such that the rate of oxidation is accelerated when a cationic surfactant is incorporated in the fluid. Such effect would be beneficial when the treatment conditions are such that the kinetics of the oxidation reaction are sluggish, such as at room temperature and below. Furthermore a neutral surfactant, such as Trilon X-100, has the benefit of retarding the rate of reaction. An anionic surfactant may have minor retardation compared to a neutral surfactant. The cationic surfactant may include, for example, cetyltrimethylammonium chloride, ester quats (quaternary ammonium compounds having two long fatty acid chains with weak ester linkages, such as the betaine surfactant class), choline derivatives possessing a quaternized nitrogen, quaternary pyridinium salts, or combinations thereof.

On some occasions, available water sources for use in the wellbore treatments are restricted or otherwise undesirable or unavailable. In such cases, the treated or recovered aqueous-based fluid may be merged with a second fluid source to be used in a treatment fluid. The second fluid source may be a higher quality water source, such as potable water, seawater, and the like. Alternatively, the second fluid source may be a lower quality fluid from other fluid sources, such as various other treatment fluids. In one embodiment, the second fluid source may contain higher amount of deleterious substance than the treated aqueous-based fluid. Merging the treated aqueous-based fluid with the second fluid source may significantly reduce the concentration of the deleterious substance in the merged aqueous fluid, which may also reduce the amount of treatment needed on the aqueous-based fluids.

In one aspect of the invention, the aqueous-based fluid may be brought to a surface location, e.g., a location close to a wellbore or subterranean formation, for being treated by the breaker composition, and the treated fluid can be recovered for various usages. For example, the treated or recovered aqueous-based fluid can be used or injected in the wellbore or subterranean formation, in other industrial usages, or when treated with additional separation and filtration techniques, may be suitable for household or agricultural use.

In another aspect of the invention, the breaker composition can also be introduced into in a wellbore and subterranean formation to treat the aqueous-based fluid in at least a portion of a wellbore or surrounding subterranean formation.

A treatment fluid (may referred to as "pre-treatment fluid") may be introduced into a wellbore and subterranean formation to perform certain pre-treatments. The breaker composition can then be introduced into the wellbore overflushing the pretreatment fluid and at least a portion of the wellbore or subterranean formation to reduce or eliminate undesirable substances in the pretreatment fluid and/or in the wellbore or subterranean formation. After the pre-treatment fluid is treated by the breaker composition in the wellbore, the pre-treatment fluid, as well as aqueous fluid already contained in the wellbore, may be flowed back and recovered to be further used for anticipated operations.

The pre-treatment fluid may also carry the breaker composition into the wellbore or subterranean formation. To avoid interfering with the anticipated performance of the pre-treatment fluid in the wellbore, the breaker composition may be designed in a format to provide a delayed-release of the active compositions. For example, to provide a delayed release of the breaker composition, the breaker composition may be encapsulated or enclosed within an outer coating that is capable of degrading at a desired time. Exemplary suitable encapsulation or coating methods include microencapsulation techniques, such as fluidized bed processes; agglomerating or pelletizing the breaker composition prior to coating the breaker composition with the degradable material; and physically mixing the breaker composition with the degradable material and forming a single, solid particle. One skilled in the art will be able to choose appropriate encapsulation or coating methods, considering the desirable delayed release time and the physical-chemical properties of the breaker composition.

The invention claimed is:

1. A method of producing a treated aqueous-based fluid to be utilized in a wellbore or surrounding subterranean formation, comprising the step of:
   contacting an aqueous-based fluid with an aqueous-soluble breaker composition comprising an oxidizing agent and a catalyst for a time sufficient to reduce or eliminate one or more deleterious substances in the aqueous-based fluid to produce a treated aqueous-based fluid suitable for use in a wellbore or surrounding subterranean formation,
   wherein the catalyst has the structure of formula (I) or formula (II):

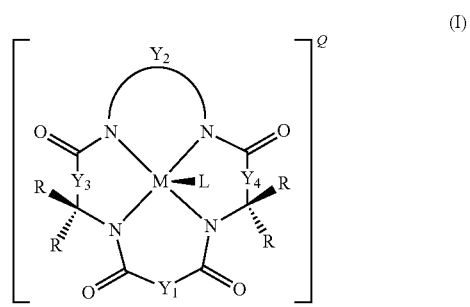

-continued

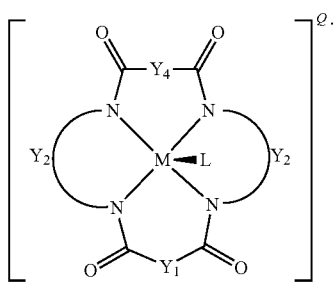

(II)

wherein Y₁, Y₃ and Y₄ each independently represent a bridging group having zero, one, two or three carbon containing nodes for substitution, and each Y₂ independently represents a bridging group having at least one carbon containing node for substitution, each said node containing a C(R), or a C(R)₂ unit and each R substituent is the same or different from the remaining R substituents and (i) is selected from the group consisting of alkyl, alkenyl, cycloalkyl, cycloalkenyl, aryl, alkynyl, alkylaryl, halogen, alkoxy, phenoxy, $CH_2CF_3$, $CF_3$ and combinations thereof, (ii) form a substituted or unsubstituted benzene ring of which two carbon atoms in the ring form nodes in the Y unit, or (iii) together with a paired R substituent bound to the same carbon atom form a cycloalkyl or cycloalkenyl ring, which optionally include an atom other than carbon; M is a transition metal with oxidation states of I, II, III, IV, V, VI, VII or VIII or selected from Groups 3, 4, 5, 6, 7, 8, 9, 10, 11 and 12 of the Periodic Table of the Elements; Q is any counterion which would balance the charge of the compound on a stoichiometric basis; and L is any labile ligand;

merging the treated aqueous-based fluid with a second aqueous-based fluid prior to use in a wellbore or surrounding subterranean formation.

2. The method of claim 1, wherein the oxidizing agent is hydrogen peroxide or an organic peroxide of the formula $R_1$—O—O—$R_2$, wherein each of $R_1$ and $R_2$ is independently H, substituted or unsubstituted alkyl, substituted or unsubstituted aryl, or alkyl or aryl substituted carbonyl.

3. The method of claim 1, wherein the catalyst has the structure of formula (III):

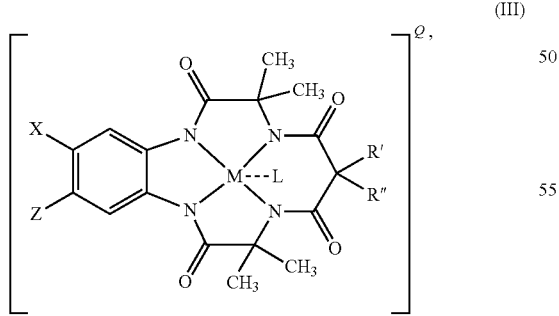

(III)

wherein each of X and Z is independently H, an electron donating group or electron withdrawing group; each of R' and R" is the same or different and (i) is selected from the group consisting of H, alkyl, alkenyl, cycloalkyl, cycloalkenyl, aryl, alkynyl, alkylaryl, halogen, alkoxy, phenoxy and combinations thereof, or (ii) R' and R" combine to form a cycloalkyl or cycloalkenyl ring, which optionally contains at least one atom other than carbon; M is a transition metal with oxidation states of I, II, III, IV, V, VI, VII or VIII or selected from Groups 3, 4, 5, 6, 7, 8, 9, 10, 11 and 12 of the Periodic Table of the Elements; Q is any counterion which would balance the charge of the compound on a stoichiometric basis; and L is absent or any labile ligand.

4. The method of claim 3, wherein the catalyst has the structure of formula (IV):

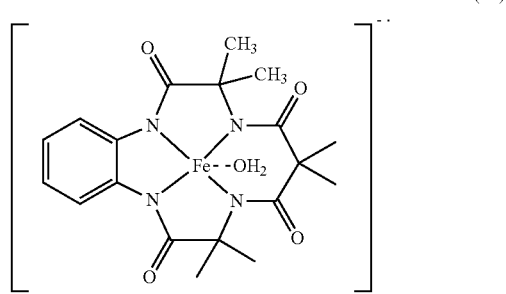

(IV)

5. The method of claim 1, wherein the catalyst has the structure of formula (V):

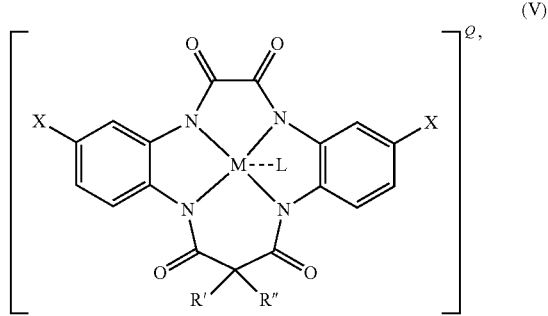

(V)

wherein each X is independently H, an electron donating group or electron withdrawing group; each of R' and R" is the same or different and (i) is selected from the group consisting of H, alkyl, alkenyl, cycloalkyl, cycloalkenyl, aryl, alkynyl, alkylaryl, halogen, alkoxy, phenoxy and combinations thereof, or (ii) R' and R" combine to form a cycloalkyl or cycloalkenyl ring, which optionally contains at least one atom other than carbon; M is a transition metal with oxidation states of, II, III, IV, V, VI, VII or VIII or selected from Groups 3, 4, 5, 6, 7, 8, 9, 10, 11 and 12 of the Periodic Table of the Elements; Q is any counterion which would balance the charge of the compound on a stoichiometric basis; and L is absent or any labile ligand.

6. The method of claim 5, wherein the catalyst has the structure of formula (VI):

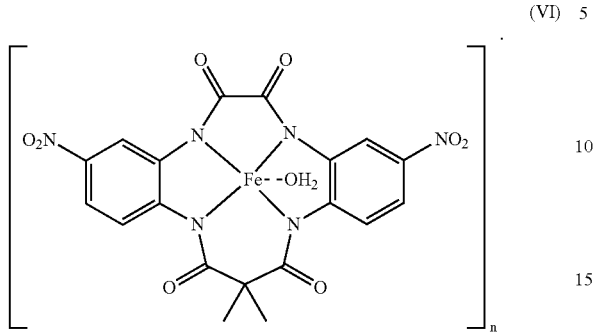

(VI)

7. The method of claim 1, wherein the breaker composition further comprises a chelating agent, selected from the group consisting of ammonium, hydroxyethylenediaminetetraacetic acid (EDTA), N-(2-hydroxethyl)ethylenediaminetriacetic acid (HEDTA), hydroxyethyliminodiacetic acid (HEIDA), methylglycine diacetic acid (MGDA), glueonie L-glutamic acid, N,N-diacetic acid (GLDA), ethylenediaminedisuccinic acid (EDDS), beta-alaninediacetic acid (beta-ADA), diethylenetriaminepentaacetic acid (beta-ADA), diethylenetriaminepentaacetic acid (DTPA), cyclohexylenediaminetetraacetic acid (CDTA), nitrilotriacetic acid (NTA), diphenylaminesulfonic acid (DPAS), alkylphosphonic acids or phosphonate salts where the alkyl group is any that provides sufficient aqueous solubility in the pH range of interest, citric acid, iminodiacetic acid, gluconic acid, and ammonium, alkali or alkaline-earth salts thereof and combinations thereof.

8. The method of claim 1, wherein the breaker composition further comprises at least one compound capable of dissociating into a cation and an anion, wherein the anion is preferentially selected from the group consisting of chloride, nitrate, perchlorate, sulfate, bromide, and phosphate.

9. The method of claim 1, wherein the breaker composition further comprises a mutual solvent or cosolvent.

10. The method of claim 1, wherein the deleterious substance is an organic substance or organometallic substance.

11. The method of claim 1, wherein the deleterious substance is a highly persistent or degradation-resistant substance.

12. The method of claim 1, wherein the deleterious substance is selected from the group consisting of crude oil residuals, grease, soluble hydrocarbons, miscible organic compounds, emulsions, suspended solids, finely sized particles, and dissolved gases.

13. The method of claim 1, further comprising, prior to the contacting step, the step of separating aqueous-immiscible components in the aqueous-based fluid from the other components in the aqueous-based fluid.

14. The method of claim 1, wherein the second fluid contains a substantially higher amount of the deleterious substance than the treated aqueous-based fluid.

15. The method of claim 1, wherein the contacting step takes place on the surface.

16. A method of recovering an aqueous-based fluid to be utilized in a wellbore or surrounding subterranean formation, comprising the steps of:
providing an aqueous-based fluid that has been extracted from a wellbore or surrounding subterranean formation; and
contacting the aqueous-based fluid with an aqueous-soluble breaker composition comprising an oxidizing agent and a catalyst for a time sufficient to reduce or eliminate one or more deleterious substances in the aqueous-based fluid, thereby recovering the aqueous-based fluid for use in a wellbore or surrounding subterranean formation,
wherein the catalyst has the structure of formula I or formula (II):

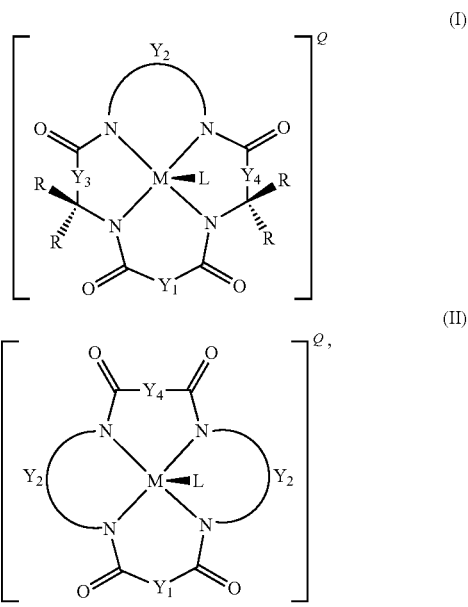

wherein $Y_1$, $Y_3$ and $Y_4$ each independently represent a bridging group having zero, one, two or three carbon containing nodes for substitution, and each $Y_2$ independently represents a bridging group having at least one carbon containing node for substitution, each said node containing a C(R), or a C(R)$_2$ unit and each R substituent is the same or different from the remaining R substituents and (i) is selected from the group consisting of alkyl, alkenyl, cycloalkyl, cycloalkenyl, aryl, alkynyl, alkylaryl, halogen, alkoxy, phenoxy, $CH_2CF_3$, $CF_3$ and combinations thereof, (ii) form a substituted or unsubstituted benzene ring of which two carbon atoms in the ring form nodes in the Y unit, or (iii) together with a paired R substituent bound to the same carbon atom form a cycloalkyl or cycloalkenyl ring, which optionally include an atom other than carbon; M is a transition metal with oxidation states of I, II, III, IV, V, VI, VII or VIII or selected from Groups 3, 4, 5, 6, 7, 8, 9, 10, 11 and 12 of the Periodic Table of the Elements; Q is any counterion which would balance the charge of the compound on a stoichiometric basis; and L is any labile ligand;
merging the treated aqueous-based fluid with a second aqueous-based fluid prior to use in a wellbore or surrounding subterranean formation.

17. The method of claim 16, wherein the oxidizing agent is hydrogen peroxide or an organic peroxide of the formula $R_1$—O—O—$R_2$, wherein each of $R_1$ and $R_2$ is independently H, substituted or unsubstituted alkyl, substituted or unsubstituted aryl, or alkyl or aryl substituted carbonyl.

18. The method of claim 16, wherein the catalyst's activity is modified by the presence of a surfactant.

19. The method of claim 18, wherein the surfactant is a cationic surfactant.

20. The method of claim 19, wherein the cationic surfactant is cetyltrimethylammonium chloride, ester quats (quaternary ammonium compounds having two long fatty acid chains with weak ester linkages, such as the betaine surfactant class), choline derivatives possessing a quaternized nitrogen, or quaternary pyridinium salts.

21. The method of claim 16, wherein the catalyst has the structure of formula (IV):

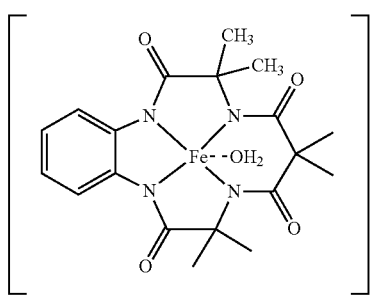

(IV)

22. The method of claim 16, wherein the catalyst has the structure of formula (VI) or formula (VII):

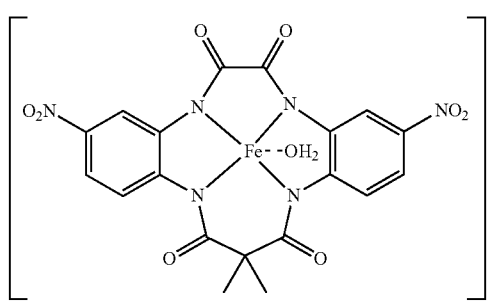

(VI)

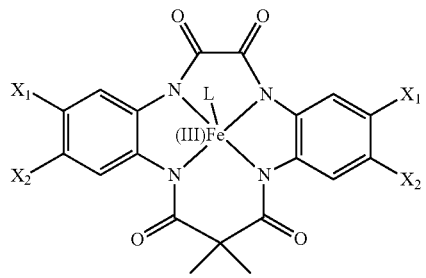

(VII)

where X1=H and X2=H, X1=NO2 and X2=H, or X1=X2=Cl.

23. The method of claim 16, wherein the aqueous-based fluid is selected from the group consisting of flow-back fluid, produced fluid, fluid from end-of-pipe stream, and combinations thereof.

24. The method of claim 16, further comprising, prior to the contacting step, the step of separating aqueous-immiscible components in the aqueous-based fluid from the other components in the aqueous-based fluid.

25. The method of claim 16, wherein the second fluid contains a substantially higher amount of the deleterious substances than the recovered aqueous-based fluid.

26. The method of claim 16, further comprising the step of introducing the recovered aqueous-based fluid back into a wellbore or surrounding formation.

27. The method of claim 16, wherein the contacting step takes place on the surface.

* * * * *